(12) United States Patent
Smith

(10) Patent No.: US 10,718,363 B2
(45) Date of Patent: Jul. 21, 2020

(54) DEVICE RETENTION AND STABILIZATION APPARATUS

(71) Applicant: Mark Smith, Palo Alto, CA (US)

(72) Inventor: Mark Smith, Palo Alto, CA (US)

(*) Notice: Subject to any disclaimer, the term of this patent is extended or adjusted under 35 U.S.C. 154(b) by 0 days.

(21) Appl. No.: 15/972,721

(22) Filed: May 7, 2018

(65) Prior Publication Data

US 2018/0266455 A1 Sep. 20, 2018

Related U.S. Application Data

(63) Continuation-in-part of application No. 14/645,377, filed on Mar. 11, 2015, now Pat. No. 9,992,885.

(51) Int. Cl.
| | |
|---|---|
| H05K 5/02 | (2006.01) |
| F16M 11/04 | (2006.01) |
| F16M 11/22 | (2006.01) |
| F16M 13/02 | (2006.01) |
| F16B 2/06 | (2006.01) |
| B60R 11/02 | (2006.01) |
| A45C 11/00 | (2006.01) |
| H04B 1/3877 | (2015.01) |
| F16M 13/00 | (2006.01) |
| F16M 11/20 | (2006.01) |

(Continued)

(52) U.S. Cl.
CPC .............. *F16B 2/065* (2013.01); *A45C 11/00* (2013.01); *B60R 11/02* (2013.01); *F16M 11/041* (2013.01); *F16M 11/046* (2013.01); *F16M 11/2021* (2013.01); *F16M 13/00* (2013.01); *F16M 13/022* (2013.01); *H04B 1/3877* (2013.01); *A45C 2011/002* (2013.01); *A45F 5/02* (2013.01); *A45F 2200/0516* (2013.01); *B60R 2011/0071* (2013.01); *F16B 2/10* (2013.01); *F16B 35/06* (2013.01); *F16B 47/00* (2013.01); *F16M 2200/022* (2013.01); *F16M 2200/027* (2013.01)

(58) Field of Classification Search
CPC ... H04B 1/3877; B60R 11/0247; F16B 2/065; F16B 2/10; F16M 11/04
See application file for complete search history.

(56) References Cited

U.S. PATENT DOCUMENTS

| | | | |
|---|---|---|---|
| D646,137 S | * | 10/2011 | Krohmer .......................... D8/73 |
| 8,328,055 B1 | | 12/2012 | Snyder |

(Continued)

*Primary Examiner* — Joshua T Kennedy
(74) *Attorney, Agent, or Firm* — John C. Merchant

(57) ABSTRACT

An apparatus for retaining and stabilizing an electronic device including base plate having an opening provided there through and adapted to accept adjustment post(s) extending through base plate opening and further extending from the base plate in the direction of an arc opening, a pair of retention wings mounted to the base plate, the retention wings bent at the free edges inward at an angle to form a retention arc with opening slightly overlapping opposing edges of the front surface of the retained electronic device, and one or more pressure interface members threaded onto the at least one threaded post, the one or more pressure interface members including at least one contact surface substantially overlaid with a material layer allowing compression deflection to maintain pressure with the rear surface a retained electronic device while allowing insertion and removal without readjustment of pressure contacts.

17 Claims, 11 Drawing Sheets

(51) Int. Cl.
  *A45F 5/02*  (2006.01)
  *F16B 47/00*  (2006.01)
  *B60R 11/00*  (2006.01)
  *F16B 35/06*  (2006.01)
  *F16B 2/10*   (2006.01)

(56) References Cited

U.S. PATENT DOCUMENTS

| | | |
|---|---|---|
| 8,770,539 B1 | 7/2014 | Hsu |
| 9,080,714 B2 * | 7/2015 | Minn ................. B60R 11/0241 |
| 9,117,351 B2 * | 8/2015 | Gulick, Jr. ........... G08B 13/149 |
| 9,160,273 B2 | 10/2015 | Schuit et al. |
| 9,568,148 B2 * | 2/2017 | Carnevali ........... B60R 11/0241 |
| 9,707,901 B2 * | 7/2017 | Lee ........................ B60R 11/02 |
| 2012/0080465 A1 | 4/2012 | Son |
| 2014/0165261 A1 | 6/2014 | Morris |
| 2014/0291469 A1 | 10/2014 | Zito et al. |

\* cited by examiner

DEVICE RETENTION AND STABILIZATION APPARATUS

CROSS-REFERENCE TO RELATED DOCUMENTS

The present invention is a continuation in part (CIP) to a U.S. patent application Ser. No. 14/645,377, entitled Retention System, filed on Mar. 11, 2015, which claims benefit to a provisional patent application Ser. No. 61/950,850 filed on Mar. 14, 2014, disclosure of which is included herein by reference.

BACKGROUND OF THE INVENTION

1. Field of the Invention

The present invention is in the field of device retention and stabilization apparatus and pertains particularly to methods and apparatus for retaining and stabilizing a phone or other display-based communications and or computing device.

2. Discussion of the State of the Art

The field of stabilization apparatus for computing and communications devices, much improvement has occurred relative to technologies and apparatus in the art dedicated to secure retention and stabilization of hand-held computing and communications devices. Such devices are display-based devices (having display screens) for user interfacing (UI) and have telecommunications and media recording capabilities.

The inventor is aware of a single fixed-arc device stabilization apparatus that is a modular apparatus that can be worn by a user or clipped to another stabilization frame or apparatus such as a tripod, a camera boom apparatus, or a hand-held extension apparatus such as a hand-held camera mounting apparatus. The fixed-arc phone retention device is described in a U.S. patent entitled Retention System, Ser. No. 14/645,377, filed on Mar. 11, 2015 by the present inventor, the full disclosure of which including specification, drawings and claims is fully incorporated herein by reference.

The fixed-arc phone retention device comprises a contiguous arcuate base that is bendable by a user to decrease or increase the presented arc. The proximal ends of the arc are bent inwards at a desired angle and demarcate a position within the arc that retains the phone with the aid of a threaded post mounted at the center of the arc. A threaded barrel may be provided on the threaded post that may be rotated along the post toward the rear surface (at center) of the screen device or phone and may come into contact with the rear surface wherein the contact may include an amount of pressure applied at the rear center of the phone to force the phone to seat between the bent-in ends of the arc such that the phone is retained within the arc by the two ends against the pressure of the threaded barrel pad.

While this apparatus works to retain the phone in a manner that a user may quickly remove the phone and reinstate the phone into the retention apparatus, it may not retain the phone in a secure manner for some applications. For example, mounting the retention device to a motorbike, bicycle, a boom overlooking water, a sky cam mount exposed to wind, etc. may require a more stable retention apparatus than a bendable fixed-arc device can provide.

Therefore, what is clearly needed is a device retention and stabilization apparatus that may be mechanically adjusted without bending a fixed arc to prevent potential destabilization of the retained screen device due to vibration, shock, gravitational force or other destabilizing forces.

BRIEF SUMMARY OF THE INVENTION

Accordingly, an apparatus for retaining and stabilizing an electronic device is provided and includes a base plate having a length, a width, and a material thickness and at least one opening adapted to accept at least one threaded post, the threaded post or posts extending through the at least one base plate opening and further extending orthogonally or at an angle from the base plate in the direction of one or both sides of the base plate, a pair of retention wings having a length, a width, and a material thickness mounted to the base plate, the retention wings having mounting tabs with through holes to accept mounting hardware, the wings bent at the free edges inward at an angle from their mounted position to form a retention arc that culminates and slightly overlaps the opposing edges of the front surface of the retained electronic device, a pair of material retention wing sleeves one each covering the retention wings, the wing sleeves creating air space between the inner sleeve wall and the inner surface of the inward bends, one or more pressure interface members threaded onto the at least one threaded post, the one or more pressure interface members including at least one contact surface substantially overlaid with a soft material layer for making contact with the rear surface of a retained electronic device, wherein the pair of retention wings are adjustable to increase or to decrease the distance there between, and wherein an electronic device may be positioned within the arc and urged against the retention ends of the retention arc by advancing the one or more pressure interface members to make contact against the rear surface of the electronic device and adjusting the pressure of that contact. The wings and back plate are overlaid with a variety of materials allowing for compression deflection necessary to allow the user to place an electronic device in the apparatus and remove it without readjusting the pressure adjustments at the back and the wings.

DETAILED DESCRIPTION OF THE INVENTION

In various embodiments described in enabling detail herein, the inventor provides a multiple piece device stabilization apparatus that may be adjusted mechanically to fit a custom phone or computing device without requiring repeated deformation of the single arc stabilization device known to the inventor. The present invention is described in enabling detail using the following examples, which may describe more than one relevant embodiment falling within the scope of the present invention.

Figure 1:
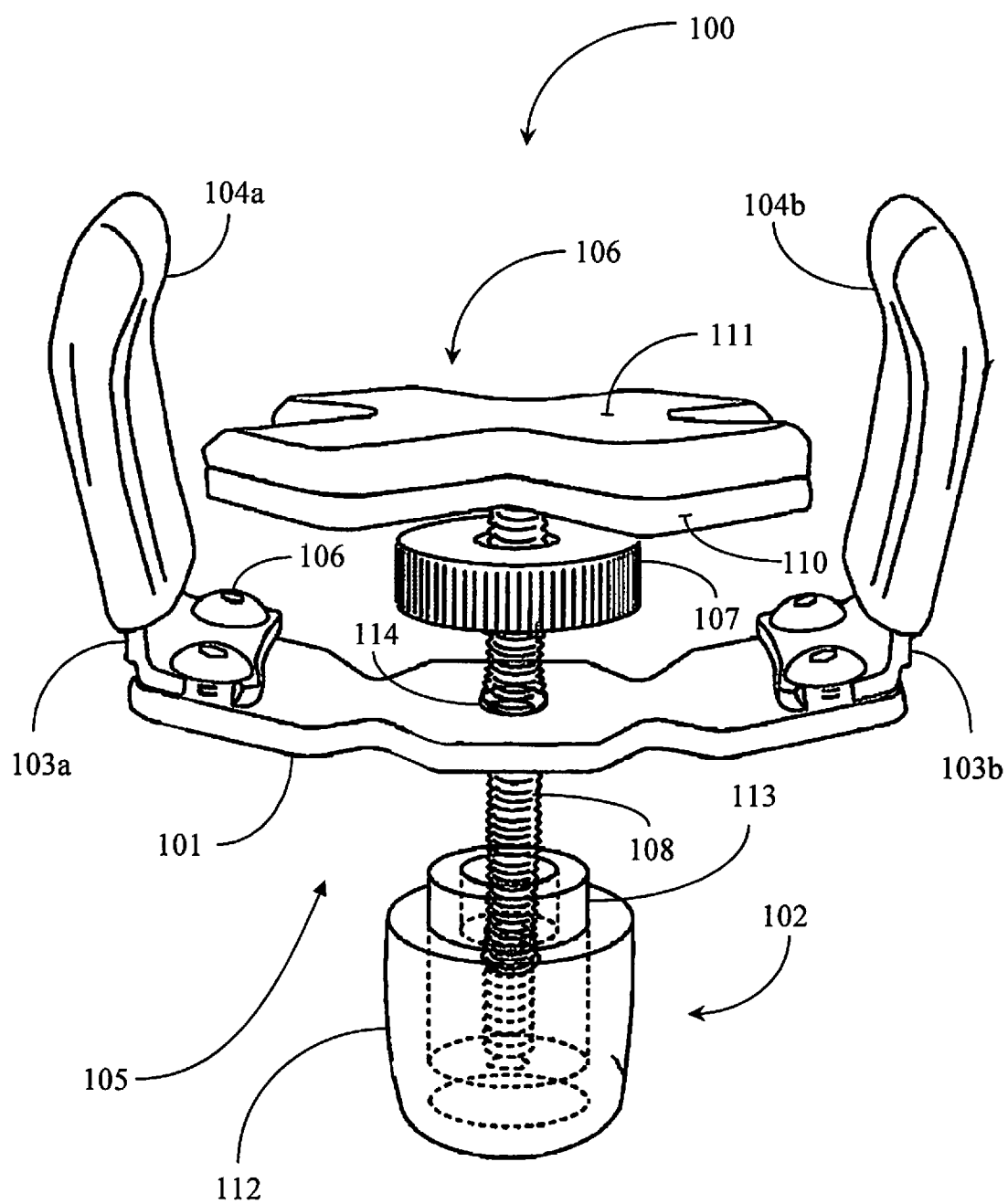
FIG. 1 is a perspective view of a device retention and stabilization apparatus according to an embodiment of the present invention.

FIG. 1 is a perspective view of a device retention and stabilization apparatus 100 according to an embodiment of the present invention. One goal of the present invention is to provide a user with the ability to remove and replace a screen based or display-based communications, media recording, and or computing device without affecting the ability of the stabilization apparatus to retain and stabilize the device. Another goal of the present invention is to provide a more definitive mechanical adjustment mechanism to the apparatus so that a user may customize the force of retention and stabilization of the apparatus for different environments having different degrees of destabilization forces present.

Referring now to FIG. 1, apparatus 100 includes a device retention arc that may be mechanically adjusted to compensate for retention of devices having different dimensional footprints without changing a bend profile of a fixed arc in an ad-hock manner. Retention arc 105 includes an arcuate base plate 101. Base plate 101 may be stamped or otherwise fabricated from a sheet metal pattern having a specified length, width, and a material thickness. Base plate 101 forms the lower part of the retention arc after it is formed such as in a mechanical form bending process. In one embodiment, base plate 101 is formed of rigid sheet metal such as steel. In a variation of this embodiment the material may be a spring steel capable of some flex but retains an original form.

Base plate 101 may be stamped in a fixture to produce a desired arcuate profile. Base plate 101 functions as the lower main part of retention arc 105 and the base component or mounting plate to which other components may be assembled to. Retention arc 101 includes a left arc-wing 103a and a right arc-wing 103b. Left and right arc-wings 103a and 103b may be formed from sheet metal parts that may be strategically cut and formed or bent to provide the opposing upper portions of retention arc 105.

Arc-wings 103a and 103b are mounted to the top surface of base plate 101 at the free ends of the component via lower tabs provided on the arc wings, the tabs bent inward and have mounting holes placed there through that align with holes placed through the base plate. At least the based plate openings are threaded to accept a pair of mounting screws 106 at each mounting location. It is noted herein but not visible in illustration that at least two or more parallel sets of mounting holes may be provided in symmetrical manner through base plate 101 to accommodate a wider setting for retention arc 105 or a narrower setting of retention arc 105.

In mounted position, left arc-wing 103a and right arc-wing 103b extend generally upward orthogonally from the inner surface (inside of arc) of base plate 101 at an angle generally greater than 90 degrees to preserve an open arcuate profile though not necessarily in alignment with a true arc. The free edges of arc-wings 103a and 103b are bent inward in the direction of the center of the arc, the bends demarcating the location where the apparatus will position and retain an electronic device such as a smart phone for example. In this example, arc-wings 103a and 103b are covered with material sleeves 104a for the left wing and 104b for the right wing. Sleeves 104a and 104b may be fabricated of rubber or another soft but resilient material that is adapted to be resilient and remember original form. Sleeves 104a and 104b are adapted to fit over each wing. The sleeves may be retained thereon such as via a set screw or other hardware, in one embodiment they are not retained to the arc wings but simply are form fit to be urged down over the host arc wings. This helps provide the compression deflection allowing a user to set and remove the electronic device from the arc and wings without having to adjust the back pressure plate.

Base plate 101 includes a central opening 114 placed orthogonally there through that may be threaded to accept a male threaded post 108. Post 108 extends into retention arc 105 in roughly the same general direction as and in substantially planar relationship with the center lines of arc-wings 103a and 103b. A contact pressure interface pad 106 is provided to function as an adjustable pressure interface member to urge a retained device such as a smart phone against the inward bends at the ends of arc-wings 103a and 103b. Pressure interface member 106 has a relatively wide footprint for flat interface against the rear of a retained device.

Pressure interface member 106 is in the symmetrical form of a cross but may be another geometric form without departing from the spirit and scope of the present invention such as a diamond, a square, a triangle, or a circle. A cross profile enables four symmetrically distributed pressure interface points extending outward from the center point of the rear footprint of the retained device. Pressure interface member 106 may include a soft material layer laminated or otherwise bound to the sheet metal surface of the contact interface. In this embodiment, a material layer 111 is provided and covers the upper interfacing surface 110 of the contact platform. Layer 111 may be a cut and laid fabric or cushion pad that may be glued down onto the surface 110 of the contact pressure interface member. Material 111 may be rubber, foam, fabric, or another soft but durable material. Material 111 is adapted to prevent hard surface to pliable surface scratching that may occur between metal and plastic surfaces coming into contact. The pressure material 111 also provides the elasticity required to maintain the electronic device firmly within the device while allowing enough compression deflection to make it possible for the user to set the pressure adjustment and then move the electronic device in and out of the apparatus without having to constantly adjust the contact pressure.

Pressure interface 106 may be threaded over the top of post 108 to a stop position via provision of a blind female threaded opening (not visible) at center from the underside surface of metal portion 110 into the material thickness but not breaking through into material 111. Therefore, pressure interface 106 may be secured in relative parallel relationship with the rear surface of a screen device being retained. In another embodiment, pressure interface 106 may be rotably mounted to or clipped to the top of threaded post 108 (set screw) using a c-clip device known to the inventor and commonly available.

In one embodiment, a threaded stabilization disc 107 is provided that may be threaded onto post 108 just beneath pressure interface 106. Stabilization disc 107 may be threaded up to the bottom metal surface of pressure interface 106 such that the upper and lower surfaces make contact but still allow for free rotation of the pressure interface. Disc 107 functions to stabilize interface 106 in a horizontal plane. Disc 107 may be locked in a position on threaded post 108 by glue, solder, or punch operation to prevent it from advancing back down the post due to vibration or other forces. It is not required that pressure interface 106 be a rotable piece to practice the present invention. The inventor deems the rotability important so that when the surfaces meet (top of pressure interface and back of phone), the pressure interface will not move under additional pressure adjustment that may be affected by a user.

Threaded post 108 may be advanced through base plate 101 using a threaded barrel shaped thumb screw 102. Thumb screw 102 includes a hard metal cylinder 113 that has a central threaded opening adapted to enable threading the cylinder onto the post on the outside of retention arc 105. Cylinder 113 may be a steel cylinder or another metal such as aluminum for example. Barrel 112 may be an ergonomic foam barrel, or a plastic knurled barrel adapted for user comfort in handling. Thumb screw 102 may be advanced onto post 108 and may be tightened to the post end by fully threading cylinder 113 down to stop. Barrel 112 may be glued onto cylinder 113 and may be fabricated of foam or other soft material for user comfort in handling.

In general use of the present invention as described in this embodiment, a user may position a smart phone or other screen device edge to edge between arc-wings 103a and 103b and upward until hindered by the inward bends or tabs at the free ends of the arc. Sleeves 103a and 103b provide grip and cushion for the phone edges. The user may hold the phone in place while advancing pressure interface 106 upward through base plate 101 by turning thumb screw 102 until the inner surface of the pressure interface 106 touches or contacts the rear surface of the phone.

Further turning urges the phone further up against the inward bends at the open end of the arc eventually forcing the phone into a retained position having three points of contact interface whereby the amount of pressure against the rear of the phone is further adjustable by the user. Sleeves 104a and 104b may afford an anti-scratch utility for the sides of the phone while material layer 111 provides the same for the back center of the phone. Base plate 101 and arc-wings 103a and 103b may have a higher rigidity characteristic than the fixed arc described relative to the US patent referenced above.

Figure 2:
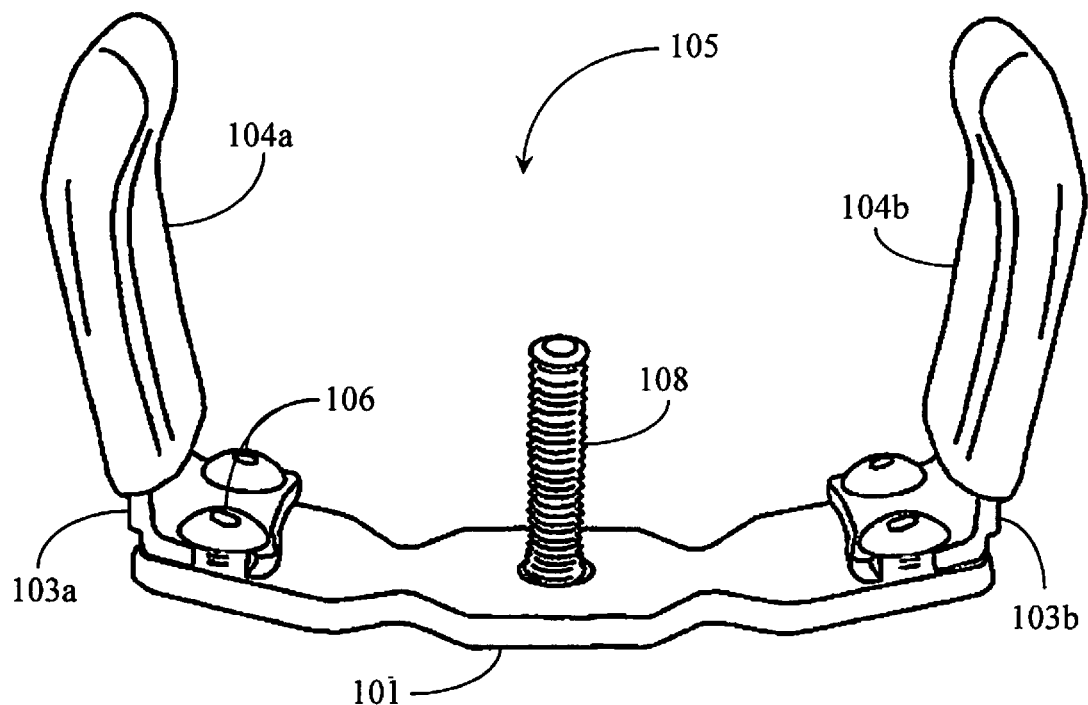
FIG. 2 is a perspective view of retention arc assembly 105 of the stabilization apparatus of FIG. 1.

FIG. 2 is a perspective view of retention arc assembly 105 of the stabilization apparatus of FIG. 1. Base plate 101 is slightly bent into an arcuate profile. This may be accomplished using a form bending or stamping machine and a form fixture to hold and stage the sheet metal pattern for bending. Arc-wings 103a and 103b may also be formed via fixture and machine. Lower mounting tabs of wings 103a and 103b may be formed about a pin axle of a specified diameter to provide a radial bend rather than a sharp bend, as a sharp bend may weaken the wing at that point.

Base plate 101 has a width dimension that roughly matches the width dimension of arc-wings 103a and 103b. The nominal width dimension of wings 103a and 103b may be approximately an inch or so. The width dimension provides a stable edge footprint for opposing sides of the smart phone or other electronic flat display devices inserted into the retention arc. In this embodiment, the pressure interface may be cut from a 3 inch or so round sheet metal plate providing additional surface contact out from a center point.

Retention arc 105 has a length that may be adjusted by removing wings 103a and 103b and remounting them at another set of mounting holes adjacent thereto. There may be two or more pairs of mounting holes allowing a minimum distance setting perhaps a middle distance setting and a maximum distance setting for the width of the formed retention arc. It will be appreciated by one with skill in the art that different apparatus might be provided for different size devices. For example, a smart phone that is largely rectangular may be held by the back and long opposing edges or the back and short opposing edges as a display content in a display screen might be set to rotate accordingly. Moreover, some devices like an I-pad, I-phone are notably larger in length and width dimensions. A kit may be provided that contains more than one base plate 101 wherein each included plate is adapted for a range of similarly sized devices. In addition, each plate includes at least two sets of mounting holes or openings at each end to enable further user adjustment ability of the retention arc to the device footprint of the device to be retained.

Figure 3:
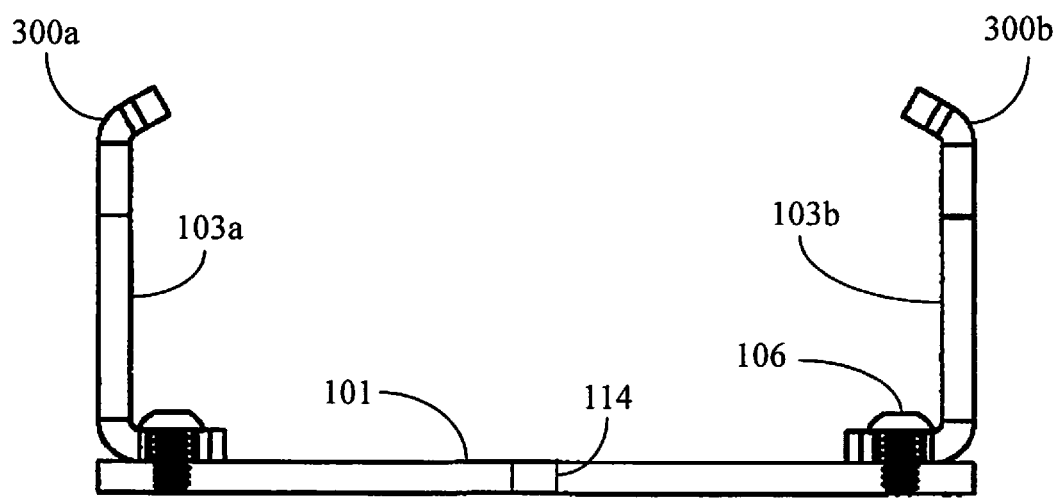
FIG. 3 is a side-section view of assembled components of the stabilization arc of FIG. 1 prior to bend operations.

FIG. 3 is a side-section view of assembled components of retention arc assembly 105 of FIG. 2 prior to bend operations. Base plate 101 is depicted flat in this example depicting post through hole 114 at center and mounting locations in section view. In one embodiment, plate 101 may not be formed into an arcuate profile but may remain flat. Arc wings 103a and 103b may also extend perpendicularly from base plate 101 at each end. In this embodiment the only bends are in the arc wing.

One bend is placed at the mounting end to form the mounting tab wherein the bend is approximately 90 degrees and is a radial but not a sharp bend. The other bend is across the device retention ends of arc-wings 103a and 103b wherein the bends are inward relative to the arc and overlap to some extent the edges of the device allowing the device to be urged up against the edges by the pressure interface. One or more threaded openings may be provided to an arc-wing such as a threaded opening that may accept a set screw to secure a material sheath over the bare metal arc-wing like sheath 104a of FIG. 2.

Figure 4:
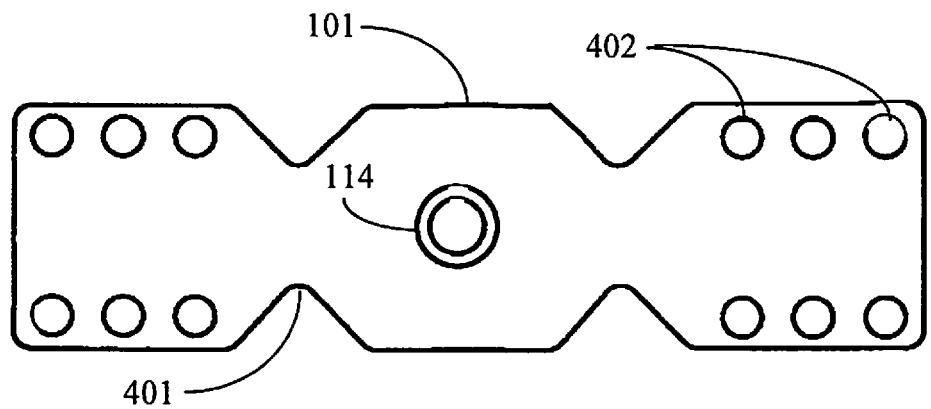
FIG. 4 is a top view of the base plate of the stabilization apparatus of FIG. 1 prior to bend operations.

FIG. 4 is a top view of base plate 101 of the stabilization device of FIG. 1 prior to bend operations. Base plate 101 depicts threaded post hole 114 at center and a pattern of threaded wing mounting holes 402 strategically arranged in pairs with each pair equally spaced apart from another pair. In this example there are six pairs of holes 402 three pairs per end of the base plate.

In this example, relief notches or areas 401 are provided in the sheet metal base plate to remove material on each side of the bend lines. In this example the mounting hole pattern on base plate 101 may accommodate up to two inches or so of device footprint difference without swapping out for a longer or shorter base plate. One reason that an arcuate shape may be desired for base plate 101 is for flex capability of the base plate. A user may be able to expand the retention arc physically to some limited degree such as if the base plate is assembled at its widest potential, but the user requires a very small expansion of the arc to retain the correctly between the arc-wings 103a and 103b.

Figure 5:
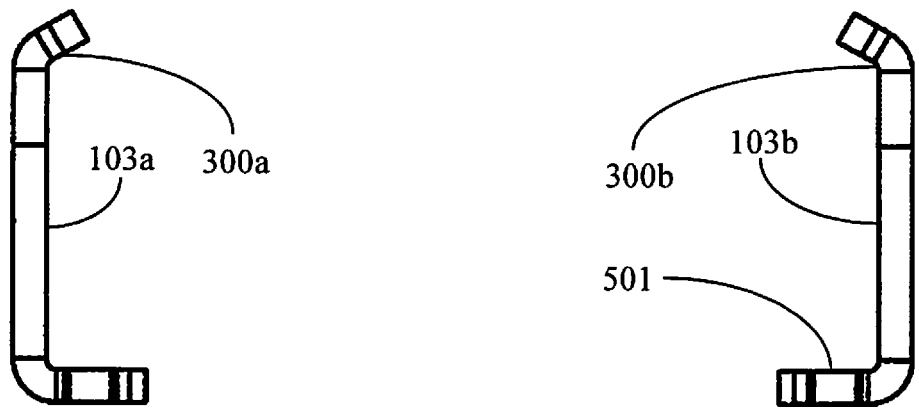
FIG. 5 is a sectioned-elevation view of the left and right wing components of the stabilization device FIG. 1 depicted without the wing covers.

FIG. 5 is a sectioned-elevation view of the left and right wing components 103a and 103b of the stabilization device FIG. 1 depicted without the wing covers. Wings 103a and 103b are mirror imaged parts that are interchangeable. In this example a pair of through holes 501 is depicted. Holes 501 align to holes 402 on base plate 101 of FIG. 4. In this example, the lower mounting tabs of each wing are formed through bending. In this case the bend is roughly 90 degrees.

In an embodiment where base plate 101 is arcuate, the bend in the wings to form the lower mounting tabs may be greater than 90 degrees to compensate for the change in inward presentation angle of the arcuate base plate. The components include an inward bend 300a for part 103a and 300b for part 103b. Angle 300a and 300b may be approximately 30 degrees from horizontal. The bent edges overlap the device edges such that they effectively stop the phone from being pushed out of the retention arc.

Figure 6:
FIG. 6 is a perspective view of the left and right wing covers of the stabilization device of FIG. 1.

FIG. 6 is a perspective view of the left and right wing covers 104a and 104b of the stabilization device of FIG. 1. Wing covers 104a and 104b are mirrored parts that are interchangeable. Wing covers 104a and 104 bare rubber sheaths in one embodiment that may be urged down over wings 103a and 103b to afford a scratch protection utility to the contact edges of a retained device.

The rubber material has a wall thickness and an internal volume shape that creates a void between the inner wall of the cover and the metal surface of the wing on the arc side of the wing tip bend. The voids, one at each side spanning the width of each wing component, creates a cushioning gap at the retained edges of the phone where they abut against the wing that compresses when the apparatus is tightened up to urge the phone against the bend features. The voids also create a certain elasticity required to maintain the electronic device firmly within the device while allowing enough compression deflection to make it possible for the user to set the pressure adjustment and then move the electronic device in and out of the apparatus without having to constantly adjust the contact pressure from the wings. Wings 104a and 104b may be secured to wing components 103a and 103b by a set screw in one embodiment. However, securing the covers to the wing components is not a requirement to practice the invention.

Figure 7:
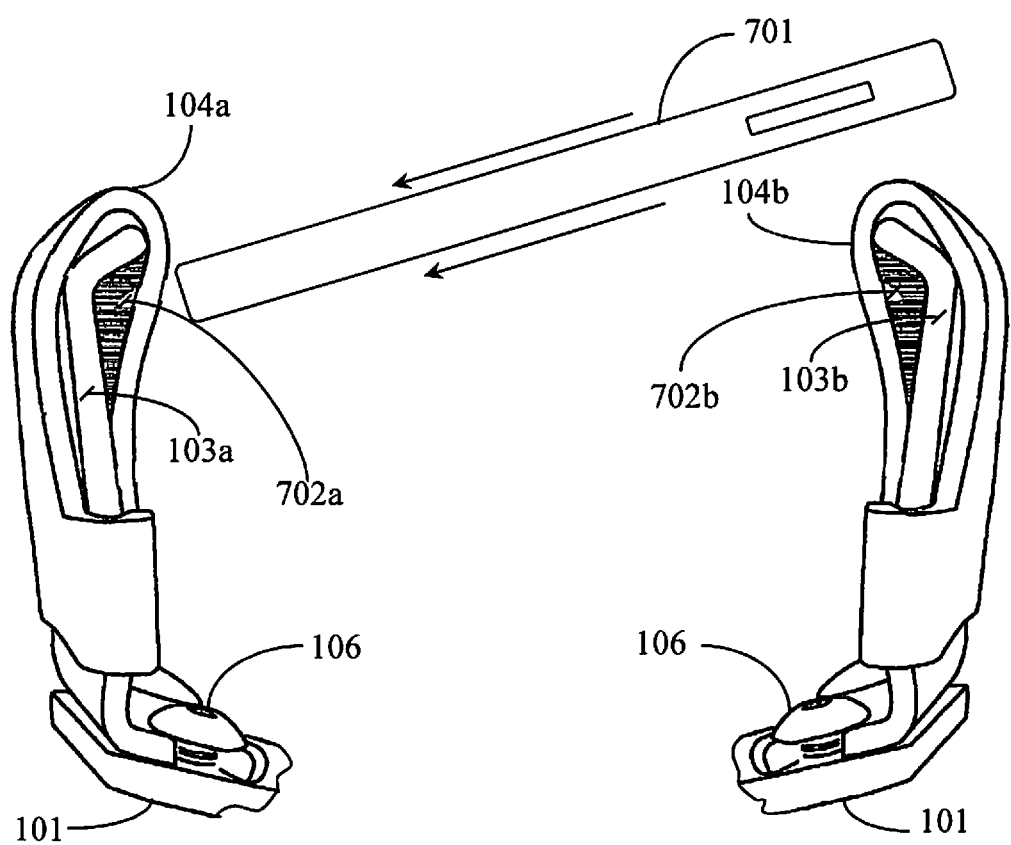
FIG. 7 is a perspective view of the left and right wing components of the stabilization device of FIG. 1 with a portion wing cover material removed for further detail.

FIG. 7 is a perspective view of the left and right wing components 103a and 103b of the stabilization apparatus of FIG. 1 with a portion of the wing cover material removed for further detail. Wing components 103a and 103b are mounted to base plate 101 via screws 106. A portion of cover 104a and 104b is removed in this view to reveal voids 702a and 702b between the inner wall of the wing covers and the inside of each bend feature. A phone device 701 for retention is depicted as entering the retention area of the retention arc according to the directional arrows. A user may urge phone 701 toward one wing component bend feature and then secure the other edge into the bend feature on the opposite side. Pressure applied on the rear surface of phone 701 via tightening of the interfacing component against the rear surface orientates and urges the phone against the overlap position of each bend feature to prevent the phone from slipping out of the retention arc. The elasticity in the back pressure material or at the wing gaps allows enough compression deflection to make it possible for the user to set the pressure adjustment at the back and the wings and then move the electronic device in and out of the apparatus without having to constantly adjust the contact pressure at these locations.

Figure 8:
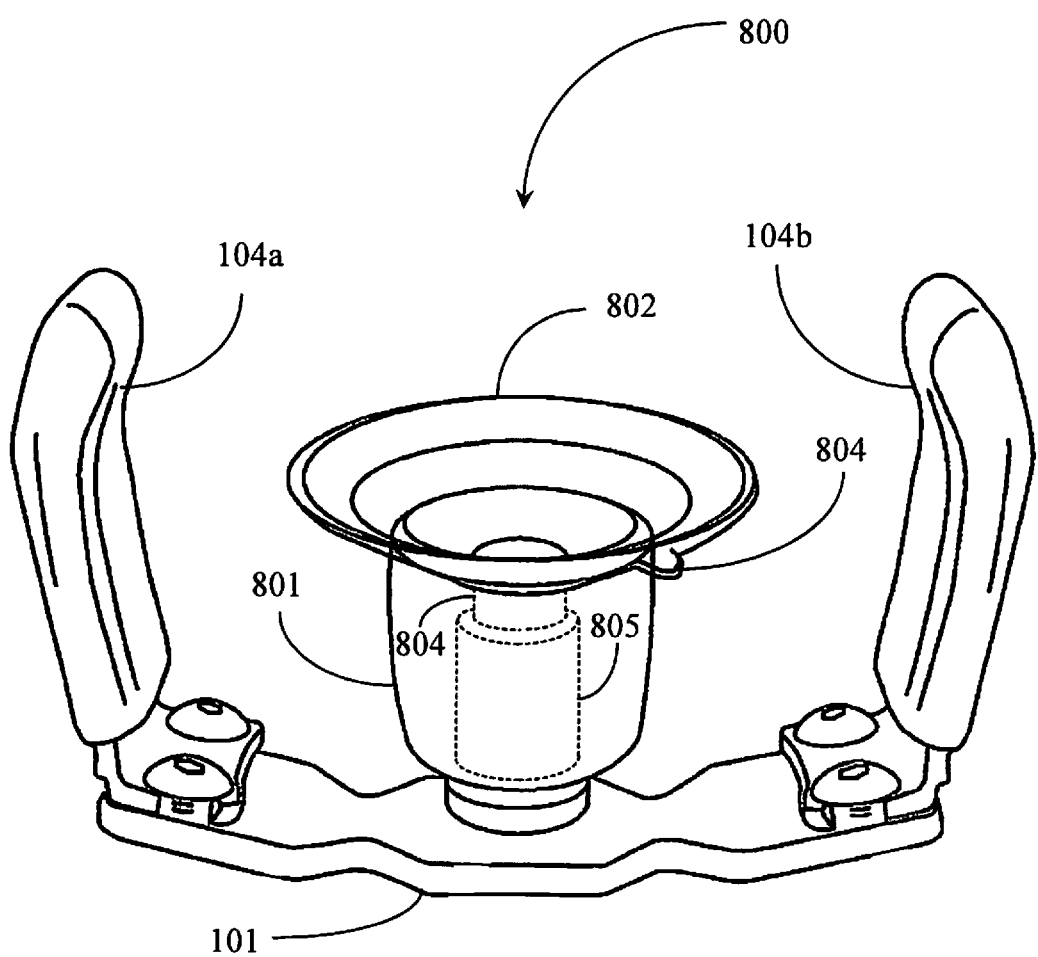
FIG. 8 is a perspective view of a device retention and stabilization arc according to another embodiment of the invention.

FIG. 8 is a perspective view of a device retention arc 800 according to another embodiment of the invention. Retention arc 800 includes arcuate base plate 101 with installed wing components with covers 104a and 104b in place. In this example, a thumb barrel assembly is provided as a pressure interface for the rear surface of the retained device. The thumb barrel assembly may be somewhat analogous to the thumb barrel of FIG. 1 but is threaded onto the post within the arc and replaces pressure interface 106 of FIG. 1.

The interfacing feature is a suction cup 802. Suction cup 802 has a tab 804 formed on its perimeter edge that may serve as a suction breaking tab for releasing any suction applied onto the rear surface of a retained device. Suction cup 802 may be fabricated of rubber and includes a threaded stem 804 at its base. Threaded stem 804 (threads not illustrated) may seat into a counter bore seat centered at the top of a metal cylinder 805. A set screw may be provided to secure the rubber suction cup 802 to the metal cylinder 805.

Metal cylinder 805 in turn may be threaded over the center set screw axle (not illustrated) that is threaded through the center of base plate 101. Cylinder 805 be covered by a foam barrel 801. Foam barrel 801 may be glued to the outer surface of cylinder 805 and provided a user ergonomic comfort in turning the suction cup thumb barrel assembly to bring the suction cup 802 against the rear surface of a retained device.

The suction cup may provide more granularity of applied pressure to the rear of a retained device and the utility of suction may add an additional utility to help prevent a device from slipping if not enough pressure is applied against the bent edges of the wing components. In this embodiment, the center hole drilled through metal cylinder 805 bottoms out within the cylinder enabling the suction cup 802 to be installed with a set screw into a counter bore or seat feature at the center of the suction cup side of the barrel.

It is noted herein that a user may hold the device retention apparatus using the base plate as a handle enabling stability to the phone or other retained device such as when recording media such as video and still images. A user may further attach a complete retention arc to another stabilization device such as a tripod, a shoulder brace, or another hand held or mobile or fixed stabilization extension device.

Figure 9:
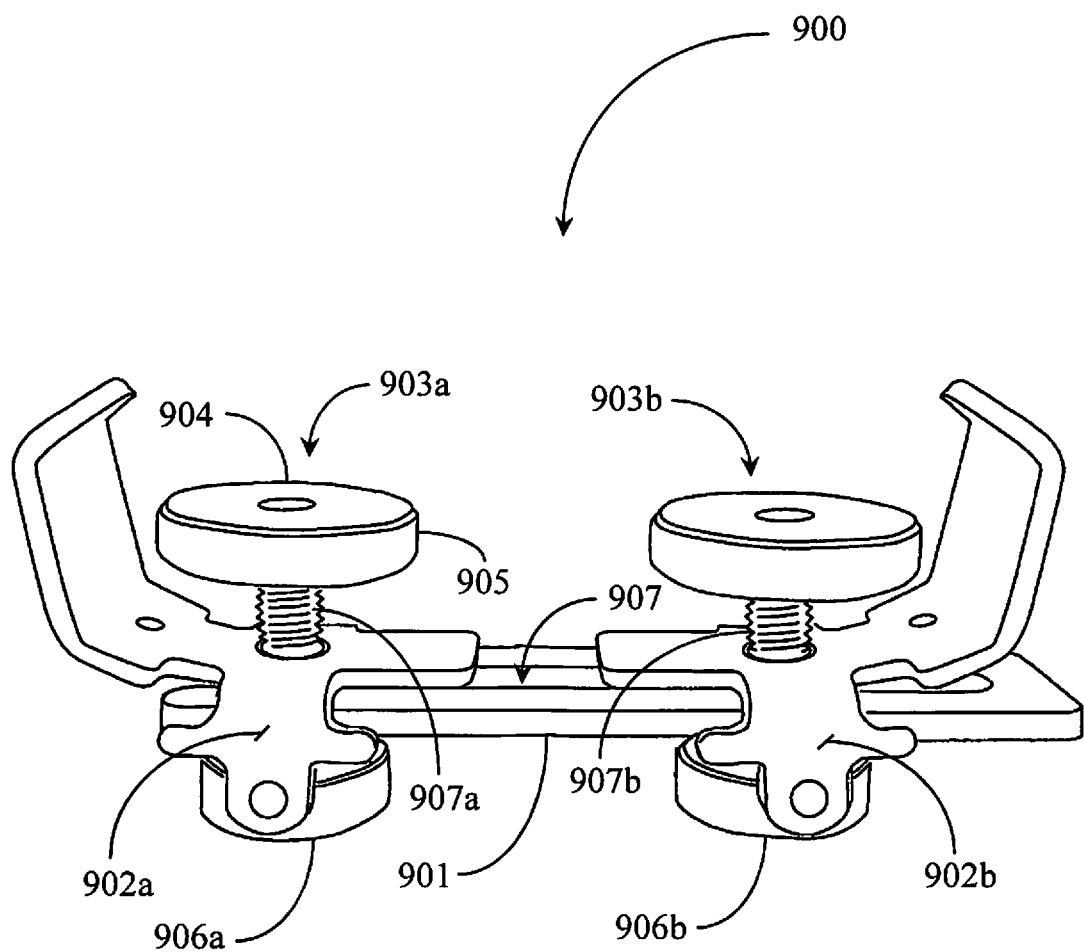
FIG. 9 is a perspective view of a device retention and stabilization device according to another embodiment of the present invention.

FIG. 9 is a perspective view of a device retention and stabilization apparatus 900 according to another embodiment of the present invention. Device retention and stabilization apparatus 900 includes a forked base plate 901. Fork plate 901 may be a sheet metal plate or a machined plate that has a length, a width, and a material thickness. Fork plate 901 includes a center through slot 907 that breaks out at one side of the fork plate. Retention apparatus 900 includes arc wing components 902a and 902b. Arc wing components 902a and 902b may be characterized as wing plates and may be metal parts fabricated of sheet metal and formed with bends to facilitate retention as was described with respect to wing components 103a and 103b of FIG. 2.

Arc wing components 902a and 902b include through holes placed there through at longitudinal center of the part but lower on the part to facilitate mounting of the arc wing components to the forked base plate 901, which may be threaded to accept a threaded set screw post 907a and 907b. In this embodiment, fork plate 901 replaces base plate 101 described further above. Arc wing components 902a and 902b are formed with bends by stamping or form bending using a bend fixture to produce respective arcuate wings that function in the same way as described with respect to wing components 103a and 103b. Each arc wing component includes an inward bend feature at the free ends and a bend that enables mounting to the fork plate.

Though not illustrated in this embodiment rubber sleeves may be provided to fit over the arc wing components to provide the no scratch utility and to create the void between the inner sheath material and the inside surface of the bend. The void also assists in creating and maintaining compression deflection necessary to allow movement of the electronic device in and out of the apparatus without adjusting the contact pressure at the back or wings. In this embodiment thumbnail screws 906a and 906b are provided to secure arc wing components 902a and 902b onto the fork plate 901 tightly so they do not slide along the fork. In this way, adjusting the width of the retention arc is not constrained so the apparatus may be set up for any width of device that is not too large for the fork length This embodiment provides four points of contact for a retained device instead of just three points of contact. Apparatus 900 includes a pressure interface disc 903a and a pressure interface disc 903b. Disc 903a includes a metal layer 905 that may be sheet metal or a machined part and a material cover 904 that may be glued onto the top surface of the metallic disc. An advantage of this particular arrangement is convenience for the user in that the user does not have to use tools to mount the wings. Another advantage is the granularity of adjustment with respect to distance apart for the wings to accommodate a device for retention by the apparatus.

In one embodiment, a user may slide both arc wing component assemblies on to the fork plate 901 from the open end. Once a desired distance is determined the user may tighten the arc wing component assemblies to the fork, so they may not slide using thumb screws 906a and 906b. To use the pressure interfaces 903a and 903b, a user may selectively rotate each interface manually up to position where it touches the rear surface of the retained device. The inward bends at the end of the arc wing components act to stabilize the retained device in orientation so that the pressure interfaces may be advanced sequentially up to contact the retained device (rear surface). Additional pressure may be applied after contact is made to adjust the level of retentive force against the retained device.

Figure 10:
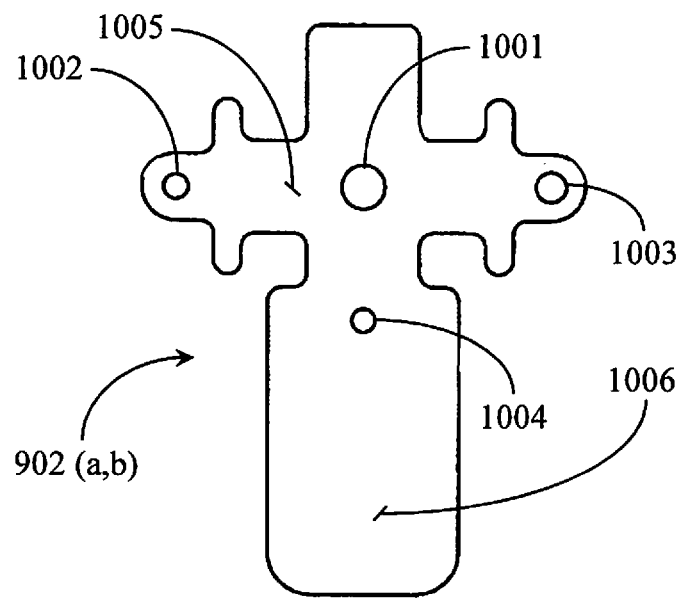
FIG. 10 is a top view of a left or right-wing plate of the stabilization device of FIG. 9 before bend.

FIG. 10 is a top view of a left or right arc wing plate 902a, 902b, of the stabilization apparatus of FIG. 9 before bending. Arc wig plate 902a,b may be formed from a stamped sheet metal piece having a length, a width and a material thickness. As a flat piece, parts 902a and 902b are interchangeable or mirrored image parts. Arc wing plate 902a and 902b have a width dimension that may be the same or comparable to wing components 103a and 103b described further above at about an inch or so. The length may be about 3 inches or so. Wing plate 902a and 902b include four through holes in the pattern. A centered through hole 1001 is threaded and may accept a threaded long set screw or threaded post. A through hole 1004 may be provided as a threaded hole at longitudinal center that accepts a set screw for retaining a rubber sleeve or sheath over each arc wing.

Wing plate 902a and 902b include a main arc portion 1006 that is bent or formed to include the arcuate profile of the wing including and the inward bend at the free edge of the part to facilitate device retention at the edges as described above relative to wing components 103a and 103b of FIG. 5. A tab portion of the pattern 1005 includes a symmetric cut pattern to remove material to facilitate better form bending of the parts.

Figure 11:
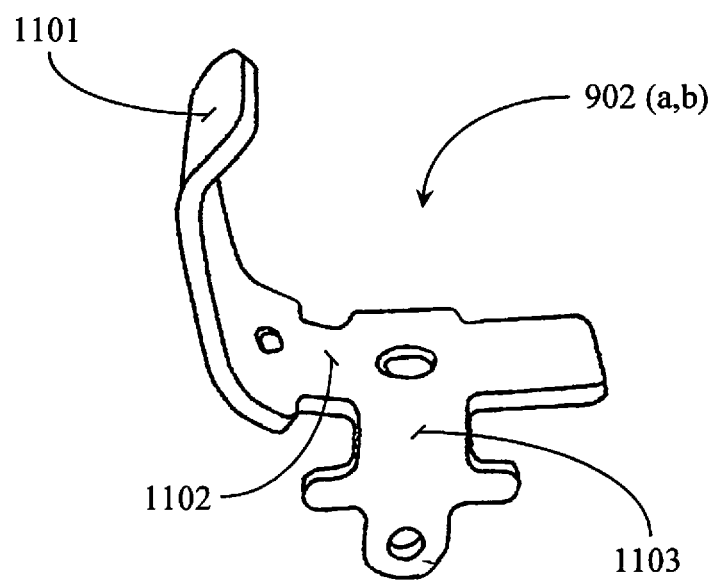
FIG. 11 is a perspective view of the left or right wing plate of the stabilization device of FIG. 9 after bend.

FIG. 11 is a perspective view of the left or right wing plate 902a, 902b of the stabilization device of FIG. 9 after bend. Wing plate 902 a or 902b is depicted after bending in this example. Bend lines include a bend line 1102 forming the upright half of the retention arc. Part 902a and 902b include the inward bend features across the top edge of the component depicted herein by a bend feature 1101. The mounting portion of component 902a and 902b include bend line 1103 and another bend line on the other side that is not visible in this view. The bend features 1103 are downward bends that serve to lower the width profile of the arc wing plate and to provide a mechanism (threaded hole 1002) for accepting a set screw that may be advanced to lock the thumb screws so that the arc wing plates do not slide out of position. Another benefit of the bend features 1103 is to prevent the plates from rotating off alignment.

Figure 12:
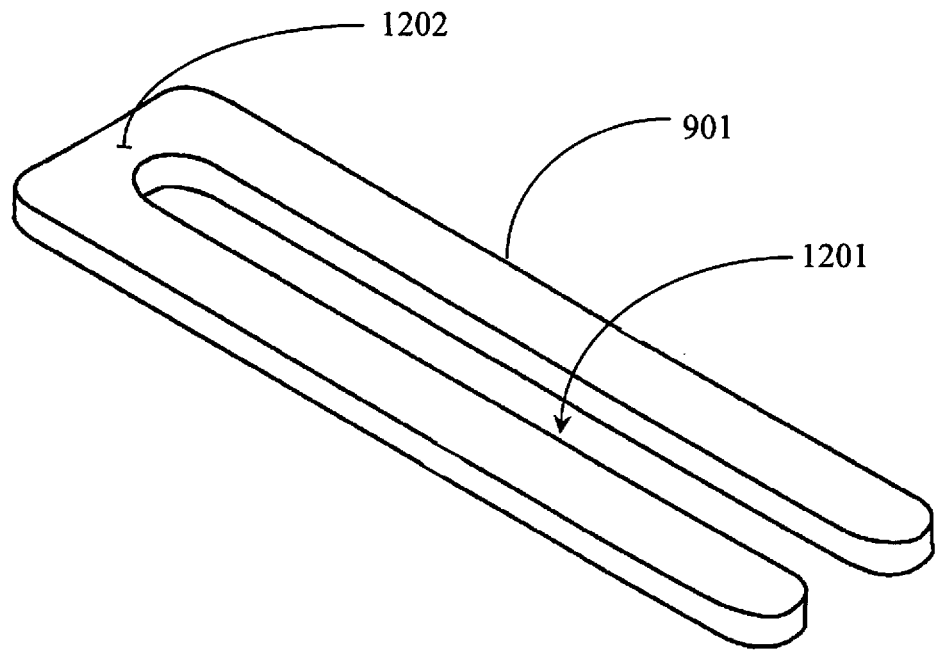
FIG. 12 is a perspective view of the base fork component of the stabilization device of FIG. 9.

FIG. 12 is a perspective view of the base fork component 901 of the stabilization apparatus of FIG. 9. Fork 901 has one open end where slot 1201, analogous to slot 907 breaks out allowing partly assembled wing plate assemblies to be slid onto the fork from that open side. A fork such as fork plate 901 may also be used as a base plate for attaching a complete retention arc to another mounting hardware or stabilization extension hardware.

Figure 13:
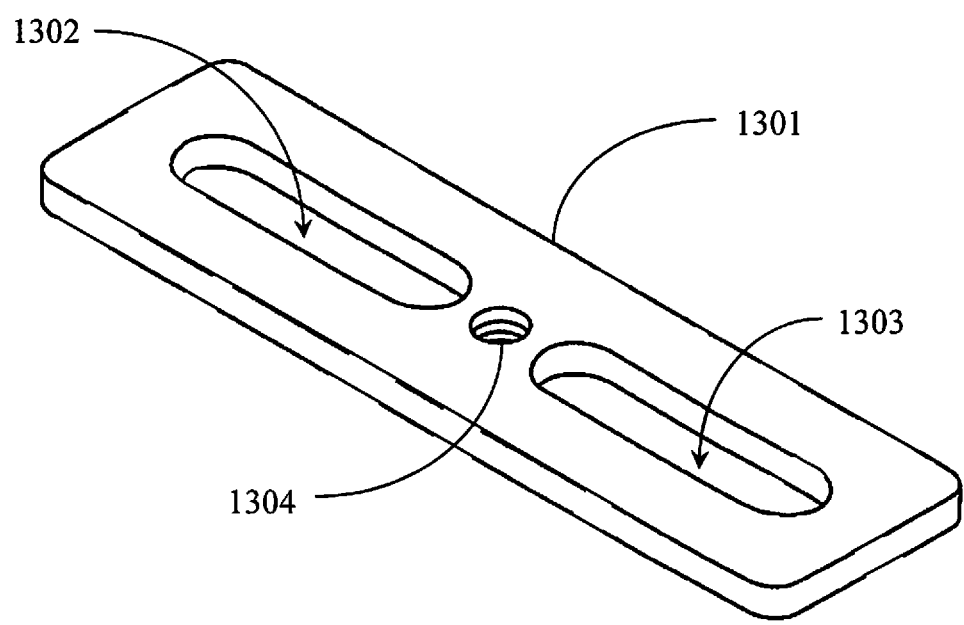
FIG. 13 is a perspective view of a base plate component that may substitute for the base fork component of FIG. 9 according to an embodiment of the invention.

FIG. 13 is a perspective view of a base plate component 1301 that may substitute for the base fork component of FIG. 9 according to an embodiment of the invention. Base plate component 1301 has two elongate through slots spaced apart along the longitudinal center of the piece. This allows some sliding adjust ability for the placement of wing plate assemblies of FIG. 9 but constrains that to the reach of each slot. In this example the threaded post or set screw is threaded through a threaded center hole 1304 in the fashion described relative to base plate 101 of FIG. 1. The length of, width of, and material thickness of plate 1301 may be similar or identical to that of fork 901 or base plate 101. In one embodiment more than one plate might be provided having differing dimensions to accommodate a larger variety of devices that might be trained by a user.

Figure 14:
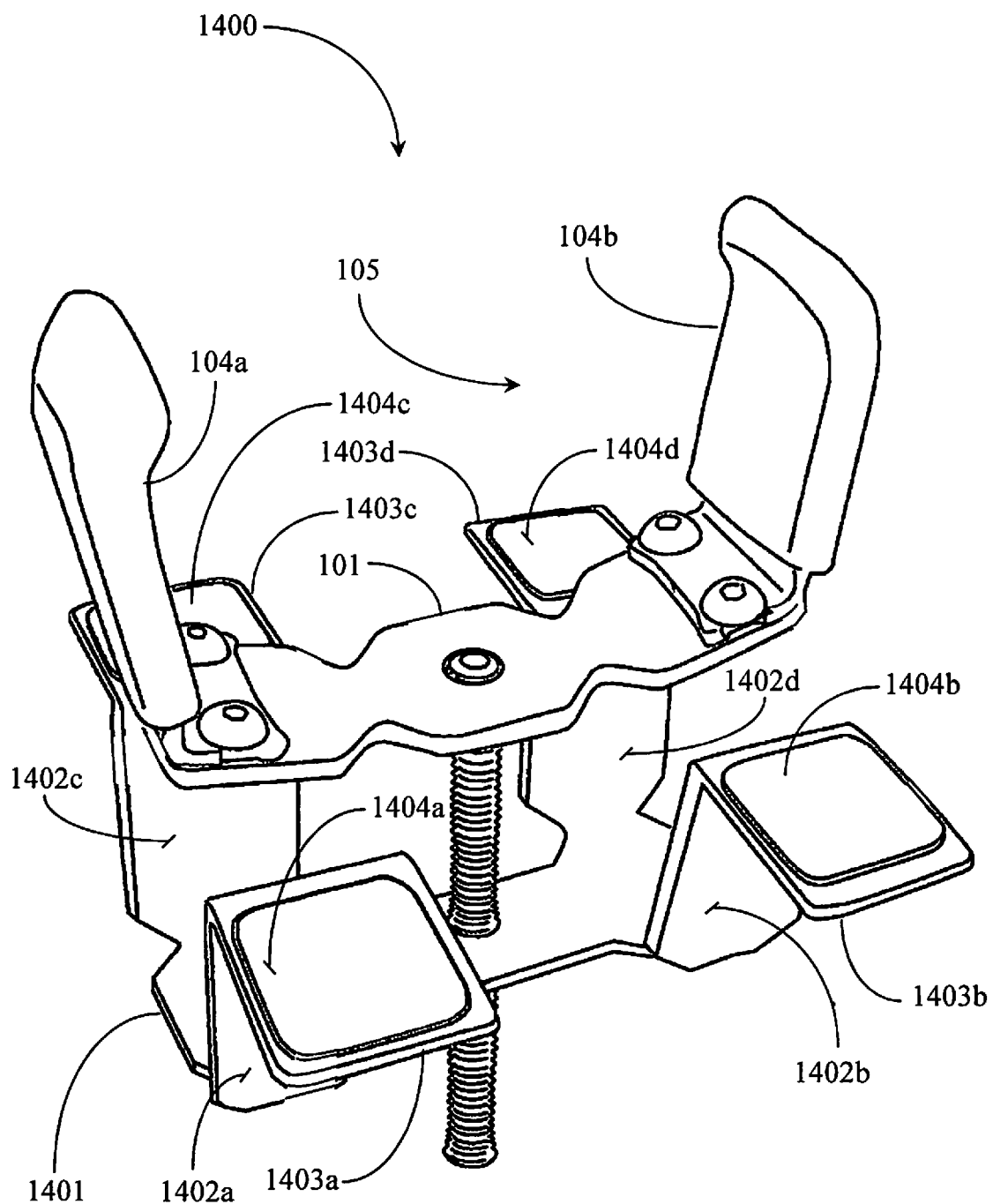
FIG. 14 is a perspective view of a device retention and stabilization apparatus according to another embodiment of the invention.

FIG. 14 is a perspective view of a device retention and stabilization apparatus 1400 according to another embodiment of the invention. Device retention and stabilization apparatus 1400 includes retention arc 105 ready to receive a device. Retention arc 105 includes base plate 101 and the wing components 103a and 103b covered by sleeves 104a and 104b.

In this embodiment, a separate sheet metal piece forms a multiple prong pressure interface 1401. Pressure interface 1401 may be fabricated from a sheet metal pattern and formed by fixture and bending process to create the required prongs and pads to retain a device within retention arc 105 at four points in this case. Pressure interface 1401 includes four upright prongs 1402a and 1402b (near side) and 1402c and 1402d (far side). Horizontal pressure pads 1403a and 1403b (near side) and 1403c and 1403d (far side) are provided as bend features at the ends of the upright prongs to create the four contact points that contact the rear surface of a retained device and consistent deflection compression. Material pads 1404a and 1404b (near side) and 1404c and 1404d (far side) such as rubber or other type of material pads are depicted on top of the form bends 1403a through 1403d. Pads may be glued on to the top surfaces of the form bend surfaces. In this case there are six total contact points against the retained device. These are the two inward bends at the ends of the wing components and the four pressure pads on the pressure interface 1401.

In this view the pressure interface 1401 is threaded onto a threaded post that may be rotably mounted to the center of base plate 101 using a c-clip or other hardware that may enable the post to be rotated left or right. Pressure interface 1401 may be advanced up the threaded post by turning the post clockwise until the pads 1404a through 1404d are in contact with the rear surface of a device to be retained. The width dimension between the inner walls of the prongs such as between prong 1402c and 1402a is larger than the outside width dimension of plate 101 so that the plate will fit down within the gap without contacting the inside of the pressure interface. In one embodiment, a foam spacer of substantial thickness might be provided between arc base plate 101 and pressure interface 1401 to stabilize the pressure interface and provide compression resistance to raising the prongs and pads to a level further up the post to make contact with an electronic device placed horizontally at the bend features of retention arc 105.

Figure 15:
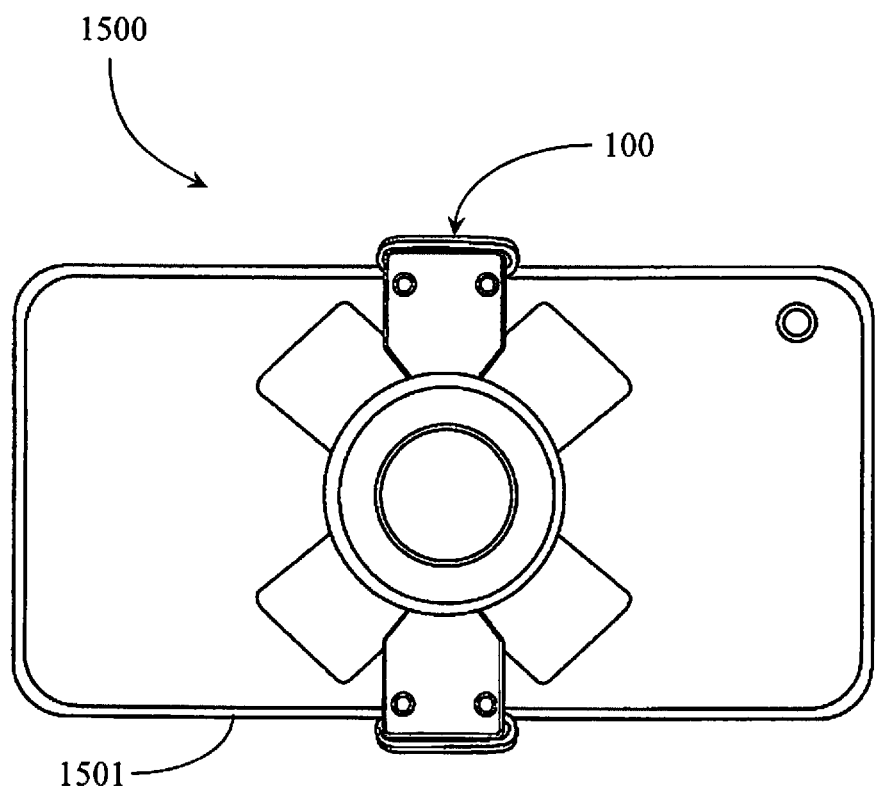
FIG. 15 is a rear-elevation view of the device retention and stabilization device of FIG. 1 holding a phone.

FIG. 15 is a rear-elevation view 1500 of the device retention and stabilization apparatus 100 of FIG. 1 retaining a device 1501. In this rear view, the cross-shaped pressure interface is flush with the rear surface of device 1501. The thumb barrel, the stabilization platform (cross shaped piece), and the rear of plate 101 are visible as well as the bottoms of the protective rubber sleeves.

Figure 16:
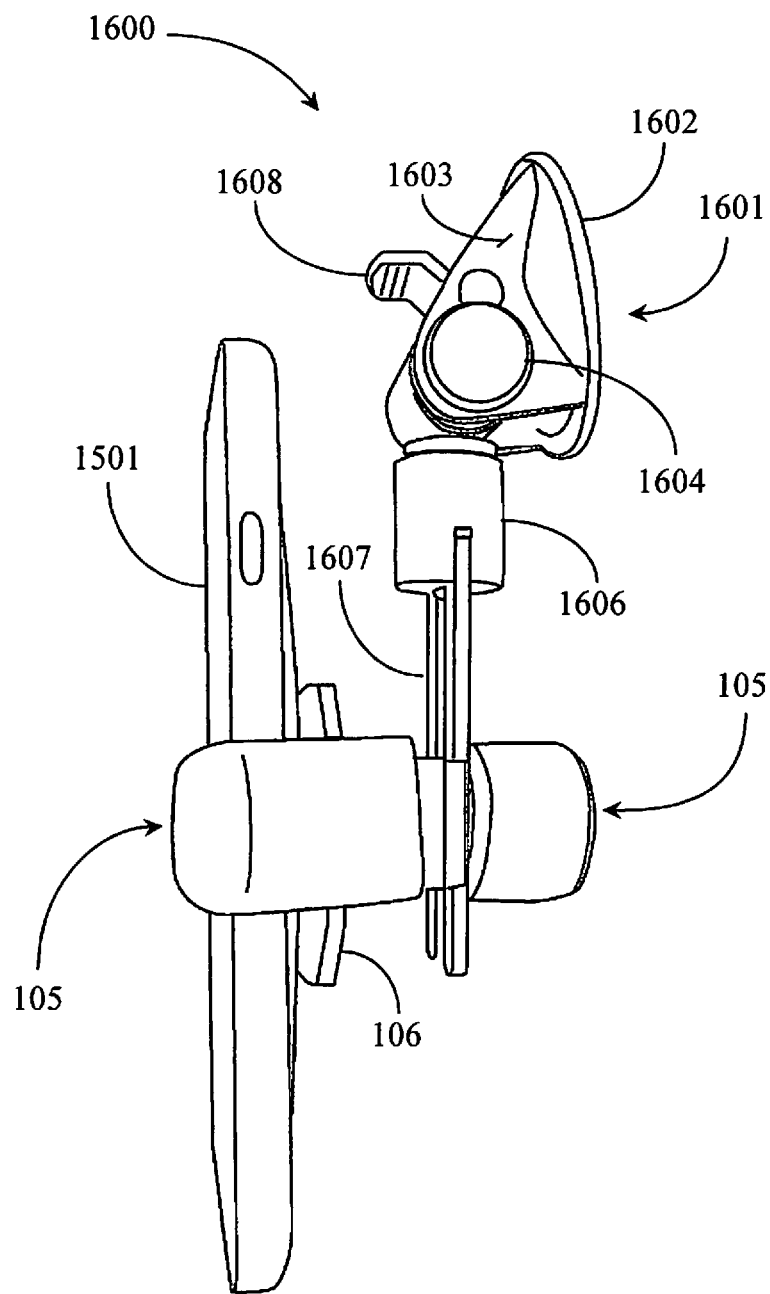
FIG. 16 is a perspective view of the device retention and stabilization device of FIG. 1 integrated with a modular swivel mount hardware according to an embodiment of the present invention.

FIG. 16 is a perspective view 1600 of device retention and stabilization apparatus 100 of FIG. 1 integrated with a modular swivel mount apparatus 1601 according to an embodiment of the present invention. View 1600 may be considered an element number depicting the combination through integration of a device retention and stabilization apparatus such as apparatus 100 of FIG. 1 or a variation thereof with swivel mount apparatus 1601 in one embodiment of the invention.

Mounting apparatus 1601 is a stabilization extension that includes a suction cup 1602 seated in a rigid or semi-rigid suction cup housing 1603. Housing 1603 is axially mounted (axle not illustrated) to a to a swivel barrel 1606. The axle may be controlled by a lock lever 1608. The axle enables the smart phone to tilt up or to tilt down from the vertical position depicted. A user may depress lever 1608 to lock the axle in any position such as tilted upward or downward from vertical or in vertical position. Swivel barrel 1606 has connection to an extension fork 1607. Fork 1607 is fixed to barrel 1606 and is mounted to apparatus 100 behind the arcuate base plate over the threaded post. Barrel thumb nut 102 may be threaded up to the fork plate and may tighten against it and the base plate of the retention arc 105 to secure apparatus 100 to the fork.

A friction knob 1604 may be provided to brake or tighten against a swivel post (not illustrated) connected to swivel barrel 1606 and to the axle that is operable via lever 1608. Therefore, apparatus 100 may be pivoted to the right or to the left of the vertical position and locked into the position using knob 1604. Combination 1600 enables four degrees of rotation to display the retained device conveniently for the user. Hardware combination 1600 might be used in a vehicle wherein the suction cup attaches to window glass. In another embodiment mounting cup 1602 is a solid piece having a glue pad and a protective layer over the glue pad like a rear view mirror swivel base.

In other embodiments the retention arc as described herein may be integrated with other mounting hardware types such as bar mounting hardware for attaching accessories to a motorcycle. The retention and stabilization apparatus of the invention may be integrated with wall mounting hardware, pole mounting hardware, and hardware that may be worn by a user such as a vest or shoulder support piece. The retention and stabilization apparatus may be integrated with hardware custom designed for sports implements such as mounting to a surfboard, or a climbing vest, or a caving helmet. Devices that are water proof for recording media underwater may be retained and stabilized using the methods and apparatus described herein. There are many possible applications.

It will be apparent to one with skill in the art that the device retention and stabilization apparatus of the invention may be provided using some or all the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention. The invention is limited only by the breadth of the claims below.

What is claimed is:

1. An apparatus for retaining and stabilizing an electronic device comprising:
    a base plate having a length, a width, and a material thickness and at least one opening accepting at least one adjustable post, the adjustable post or posts extending through the at least one base plate opening and further extending orthogonally from the base plate in a direction of one or both sides of the base plate;
    a pair of retention wings having a length, a width, and a material thickness mounted to the base plate, the wings bent inwardly at distal ends at an angle from a mounted position to form a retention arc that is configured to slightly overlap opposing edges of a front surface of the retained electronic device;
    a pair of elastic retention wing sleeves covering the retention wings, each wing sleeve creating a void defined by an inner surface of the inward bends and the inner sleeve wall of each sleeve between lines of contact along the distal ends of the wings to a line of contact between the bends and a proximal end of the retention wings;
    one or more pressure interface members threaded onto the at least one adjustable post, the one or more pressure interface members including at least one contact surface configured for contacting a rear surface of a retained electronic device;
    wherein the pair of retention wings are adjustable to increase or to decrease a distance there between, and wherein an electronic device may be positioned within the retention arcs and urged against the retention wing sleeves adjacent the retention arcs by advancing the one or more pressure interface members to make contact against the rear surface of the electronic device and adjusting the pressure of that contact; and
    wherein the retention wing sleeves and corresponding voids between the inner sleeve wall and the inner surface of the inward bends are configured to provide enough elasticity to maintain retention of an inserted electronic device while also allowing the electronic device to be removed from the apparatus without having to reposition the wings or pressure interface members.

2. The apparatus of claim 1 wherein the retention wings have mounting tabs with through holes to accept mounting hardware.

3. The apparatus of claim 1 wherein the at least one contact surface of the one or more pressure interface members is substantially overlaid with a soft material layer for contacting the rear surface of a retained electronic device.

4. The apparatus of claim 3 wherein the soft material layer for contacting the rear surface of a retained electronic device provides the elasticity to maintain the electronic device while allowing enough compression deflection to allow a user to remove the electronic device without repositioning the one or more pressure interface members.

5. The apparatus of claim 1 wherein the one or more posts are threaded.

6. The apparatus of claim 5 wherein a threaded thumb screw is attached to the one more threaded posts to assist a user in positioning the one or more pressure interface members toward or away from the base plate.

7. The apparatus of claim 1 wherein an adjustable stabilization disc mounted with the one or more posts between the base plate and the one or more pressure interface members.

8. The apparatus of claim 7 wherein the adjustable stabilization disc is threaded.

9. The apparatus of claim 7 wherein the adjustable stabilization disc comprises a thumb barrel with foam cover.

10. The apparatus of claim 1 wherein the one or more interface members is a suction cup.

11. The apparatus of claim 10 wherein the suction cup has a suction breaking tab for releasing any suction applied onto the rear surface of a retained device.

12. The apparatus of claim 1 wherein the base plate includes one or more through slots, the retention wings enabled for positioning along the one or more through slots, a threaded post is positioned immediately adjacent each retention wing, and each threaded post having a pressure interface member thus allowing a retained device to be positioned within the apparatus using four points of pressure.

13. The apparatus of claim 1 wherein the one or more pressure interface members is multipronged and thus capable of exerting pressure at multiple points on the rear surface of the retained device.

14. The apparatus of claim 13 wherein the one or more multipronged pressure interface members are positioned to exert pressure to portions of the rear surface of the retained device which extend beyond the perimeter of the base plate.

15. The apparatus of claim 14 wherein the one or more multipronged pressure interface members enabled the apparatus to exert at least 6 points of pressure against the retained device.

16. The apparatus of claim 1 wherein the one or more pressure interface members is cross shaped.

17. The apparatus of claim 1 also having a mount for attaching the apparatus to a surface.

* * * * *